US008543660B2

(12) United States Patent
Roberts et al.

(10) Patent No.: US 8,543,660 B2
(45) Date of Patent: Sep. 24, 2013

(54) SYSTEMS AND METHODS FOR BRIDGING AND MANAGING MEDIA CONTENT ASSOCIATED WITH SEPARATE MEDIA CONTENT NETWORKS

(75) Inventors: Brian F. Roberts, Dallas, TX (US); Anthony M. Lemus, Irving, TX (US); Michael D'Argenio, Green Brook, NJ (US); Donald H. Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 172 days.

(21) Appl. No.: 13/117,647

(22) Filed: May 27, 2011

(65) Prior Publication Data

US 2012/0304233 A1  Nov. 29, 2012

(51) Int. Cl.
*G06F 15/16* (2006.01)
*G06F 15/173* (2006.01)
*G06F 17/30* (2006.01)
*G06F 17/00* (2006.01)
*G06F 15/18* (2006.01)
*H04N 7/18* (2006.01)
*H04N 7/173* (2011.01)

(52) U.S. Cl.
USPC ........... 709/217; 709/219; 709/223; 709/225; 709/249; 707/711; 707/736; 707/741; 707/802; 707/812; 725/82; 725/87; 725/109; 725/119; 706/50; 706/60; 706/61

(58) Field of Classification Search
USPC ................... 725/82, 87, 109, 119; 709/217, 709/219, 223, 225, 249; 707/711, 736, 741, 707/802, 812; 706/50, 60, 61
See application file for complete search history.

(56) References Cited

U.S. PATENT DOCUMENTS

| | | | |
|---|---|---|---|
| 2009/0106388 A1* | 4/2009 | Iwami et al. | 709/217 |
| 2010/0115606 A1* | 5/2010 | Samovskiy et al. | 726/15 |
| 2010/0145760 A1* | 6/2010 | Cambre et al. | 705/9 |
| 2010/0169497 A1* | 7/2010 | Klimentiev et al. | 709/228 |
| 2010/0191783 A1* | 7/2010 | Mason et al. | 707/822 |
| 2010/0332401 A1* | 12/2010 | Prahlad et al. | 705/80 |
| 2010/0332479 A1* | 12/2010 | Prahlad et al. | 707/741 |
| 2010/0333116 A1* | 12/2010 | Prahlad et al. | 719/328 |
| 2011/0022812 A1* | 1/2011 | van der Linden et al. | 711/163 |
| 2011/0055218 A1* | 3/2011 | Capuozzo et al. | 707/741 |
| 2011/0252018 A1* | 10/2011 | Bhose et al. | 707/711 |
| 2011/0252420 A1* | 10/2011 | Tung et al. | 718/1 |
| 2012/0192263 A1* | 7/2012 | Lin et al. | 726/12 |
| 2012/0278622 A1* | 11/2012 | Lesavich et al. | 713/168 |
| 2012/0281706 A1* | 11/2012 | Agarwal et al. | 370/395.53 |
| 2012/0281708 A1* | 11/2012 | Chauhan et al. | 370/401 |

* cited by examiner

*Primary Examiner* — Hoang-Vu A Nguyen-Ba

(57) ABSTRACT

An exemplary system includes at least one computing device located within a local media content network and configured to 1) generate a media index of local media content stored by one or more media content access devices located within the local media content network and cloud media content stored by one or more cloud computing devices located within a cloud media content service network and 2) manage the local media content and the cloud media content based on the media index and on a predefined media management heuristic. Corresponding methods, systems, and apparatus are also disclosed.

20 Claims, 10 Drawing Sheets

| Device ID | Device Type | Media Format | Connection | DRM | Interface |
|---|---|---|---|---|---|
| 202-1 | STB | HD MPEG-2, … | LAN | A | HDMI, S-Video, Composite, USB, Ethernet, Wi-Fi |
| 202-2 | Smartphone | .MOV, MP3, MP4, AAC, JPEG, PGN... | WAN | B | Wi-Fi, USB, 3G/4G |
| 202-3 | TV | HD MPEG-2, … | LAN | A | HDMI, S-Video, Composite, USB, Ethernet, Wi-Fi |
| 202-4 | Laptop | .MOV, MP3, MP4, AAC, JPEG, PGN... | LAN | A, B | HDMI, S-Video, USB, Ethernet, Wi-Fi |
| 202-5 | Tablet | .MOV, MP3, MP4, AAC, JPEG, PGN... | None | B | Wi-Fi, USB |
| 204 | Server | .MOV, MP3, MP4, AAC, JPEG, PGN... | WAN | A, B | Internet |

Fig. 4

SYSTEMS AND METHODS FOR BRIDGING AND MANAGING MEDIA CONTENT ASSOCIATED WITH SEPARATE MEDIA CONTENT NETWORKS

BACKGROUND INFORMATION

As digital media and electronic device technologies have advanced, digital media has become more accessible than ever before. To illustrate, media content providers may choose to distribute media content over a variety of available distribution channels such as media subscription networks (e.g., subscription television and radio networks), telecommunications networks (e.g., mobile phone networks), the Internet, and other distribution channels. In addition, a person wanting to consume media content has a plethora of available electronic devices to choose from and use to access and consume media content made available over one or more media distribution channels. For example, a person may use a personal computer, television, set-top box, digital video recorder ("DVR"), portable media player (e.g., an mp3 player), mobile phone, tablet computer, e-reader device, and/or other electronic device to access and consume media content.

However, challenges remain in distributing, accessing, and consuming media content. As an example, different electronic devices have different capabilities related to accessing and processing media content. Consequently, it is not uncommon for a user of an electronic device to experience not being able to access and/or consume certain media content because the capabilities of the device are not compatible with the media content. Consequently, users of electronic devices are usually forced to become aware of which types and/or formats of media content can be accessed and processed by their particular electronic devices.

As another example, different content providers provide media content in different formats and in accordance with different content access policies enforced by different digital rights management ("DRM") technologies. Accordingly, a user of an electronic device may have to deal with a variety of different media content formats, content access policies, and/or DRM technologies when accessing and consuming content. For example, a user may learn that while a particular electronic device is able to access and process media content from a provider, another electronic device may not be equipped to access and process the same media content from the provider due to the format, content access policy, and/or DRM technology associated with the media content. Such experiences may lead some users to spend significant time researching and installing various codecs, media player applications, and/or other media content processing applications onto electronic devices in hopes of expanding the capabilities and/or content access rights of the devices. Unfortunately, such efforts are time consuming, not guaranteed to work or to be implemented correctly, and/or overly complicated for many users.

As another example, a person using multiple electronic devices and/or media networks to access and consume media content is typically required to manually keep track of where the media content is stored (e.g., which of the devices stores which instances of media content) in order to be able to use an appropriate device and/or media network to access and consume the media content. Such manual management of media content can become complicated and even overwhelming for a user who uses various electronic devices and/or media networks to access and consume media content. Moreover, manual management of media content can limit the user's ability to access media content depending on where the media content is stored and which electronic device and/or media network is being used.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 4 illustrates an exemplary device index according to principles described herein.

DETAILED DESCRIPTION OF PREFERRED EMBODIMENTS

Exemplary systems and methods for bridging and managing media content associated with separate media content networks are disclosed herein. As described in detail herein, media content stored in, accessible by way of, and/or otherwise associated with separate media content networks may be bridged and managed in accordance with a predefined media management heuristic. The bridging and managing of the media content may facilitate providing a user with agnostic access to the media content. As used herein, "agnostic access" may refer to a user obtaining access to media content without the user having to be aware of attributes of devices (e.g., device types, media processing capabilities such as codecs and/or content access rights, network connections, locations, settings, available connection interfaces, etc.) used to access and process the media content and/or attributes of the media content itself (e.g., a particular source and/or storage location of the media content, a distribution channel used to access the media content, a service and/or content provider associated with the media content, content access rights of the media content, bit rates of the media content, resolutions of the media content, data formats of the media content, etc.). Because access to the media content is agnostic, the user need not manually keep track of and/or rely on the user's knowledge of the locations at which media content is stored (e.g., which user device the media content is stored on), the media data formats in which media content is stored, the content access rights of media content, etc. Instead, the systems and methods described herein provide intelligent management of bridged media content in accordance with a predefined media management heuristic behind the scenes (i.e., in a transparent manner from the user's perspective) to facilitate agnostic and/or seamless access to the media content by the user. These and/or other benefits provided by the disclosed exemplary systems and methods will be made apparent herein.

As used herein, "media content" may refer generally to any content (e.g., digital media content) accessible via one or more media content access devices for experiencing by a user. Media content may include one or more instances of media content, and the term "media content instance" will be used herein to refer to particular instance of media content, such as any television program, on-demand media program, pay-per-view media program, broadcast media program, multicast media program, narrowcast media program, IPTV media content, advertisement (e.g., commercial), video, movie, song, image, photograph, sound, or any segment, component, or combination of these or other forms of media content that may be viewed or otherwise experienced by a user.

Figure 1:
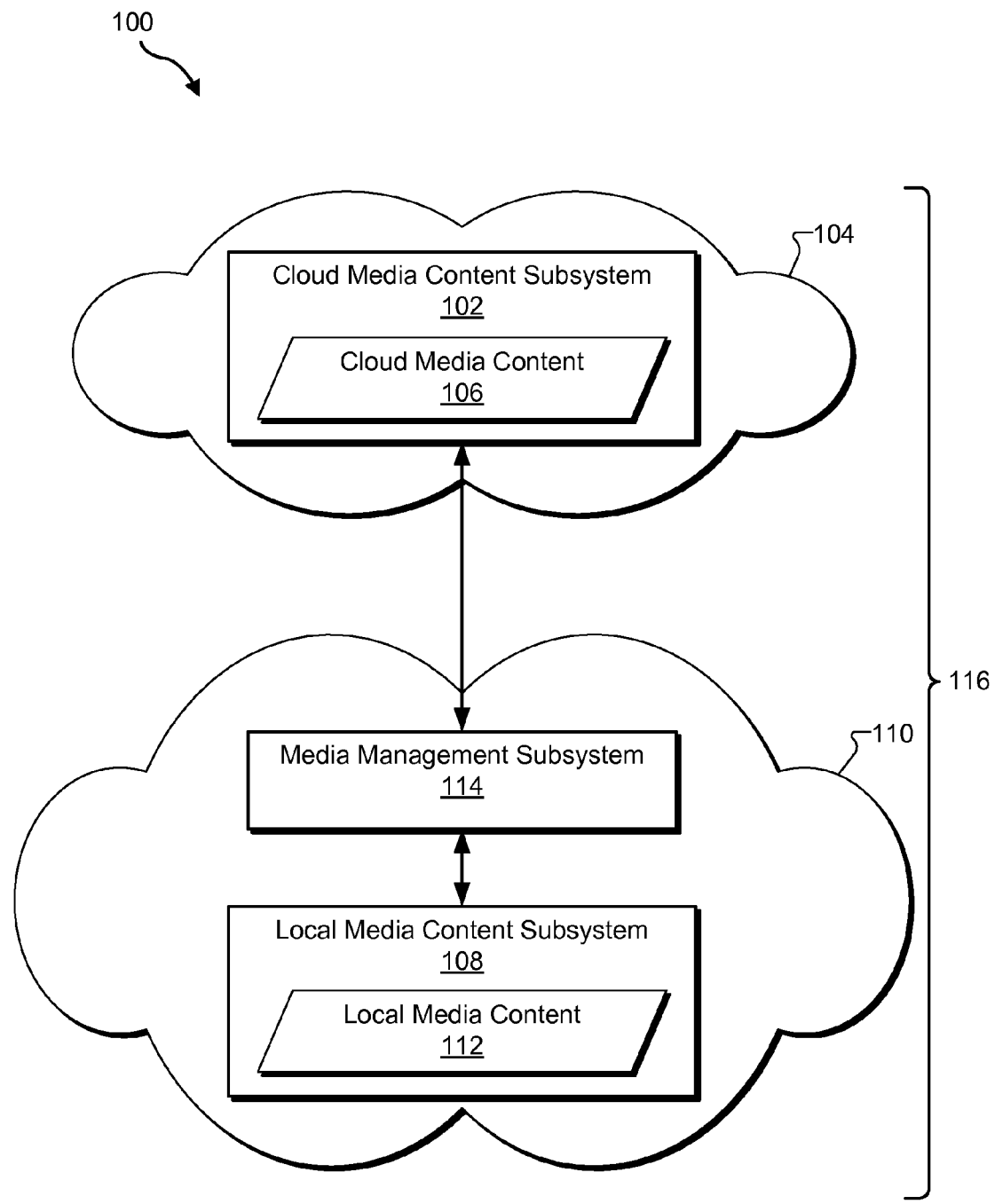
FIG. 1 illustrates an exemplary media content management system according to principles described herein.

Turning now to the drawings, FIG. 1 illustrates an exemplary media content management system 100 ("system 100"). As shown, system 100 may include a cloud media content subsystem 102 ("cloud subsystem 102") located within a cloud media content network 104 ("cloud network 104") and configured to store and/or distribute cloud media content 106, a local media content subsystem 108 ("local subsystem 108") located within a local media content network 110 ("local network 110") and configured to store local media content 112, and a media management subsystem 114 ("management subsystem 114") located within local network 110 and communicatively coupled to cloud subsystem 102 and local subsystem 108.

As described in more detail below, management subsystem 114 may be configured to bridge local media content 112 stored in local network 110 and cloud media content 106 stored in cloud network 104 to create an overall media content access network 116 that includes both cloud media content 106 and local media content 112 stored within cloud network 104 and separate local network 110, respectively. After a bridge between cloud media content 106 and local media content 112 is formed, management subsystem 114 may automatically and intelligently manage cloud media content 106 and local media content 112 based on a predefined media management heuristic in any of the ways described herein, including in one or more ways that facilitate agnostic access to cloud media content 106 and/or local media content 112 by a user.

While FIG. 1 illustrates a single cloud network 104 and a single local network 110, this is illustrative only. One or more of the principles described herein in reference to cloud network 104 and/or local network 110 may be applied to one or more additional or alternative networks to bridge media content associated with any number of separate networks with which media content is associated. The elements of system 100 will now be described in additional detail.

Local network 110 may include a local area network such as a home, business, wireless (e.g., Wi-Fi), Ethernet, and/or other local area network. Local subsystem 108 may include one or more media content access devices located within local network 110. In certain examples, a local media content access device is located within local network 110 by being both physically located within a footprint of local network 110 and communicatively connected to one or more other devices in local network 110 via local network 110. For example, a media content access device within range of a Wi-Fi signal of a Wi-Fi network and configured to communicate with one or more other devices within range of the Wi-Fi signal via the Wi-Fi network is located within the Wi-Fi network.

One or more of the media content access devices located within local subsystem 108 may store local media content 112 and other data descriptive of and/or otherwise associated with local media content 112. Local media content 112 may be stored in accordance with one or more media data formats, such as Motion Picture Experts Group ("MPEG"), Windows Media Video ("WMV"), MP3, MP4, Advanced Audio Coding ("AAC"), Advanced Video Codec High Definition ("AVCHD"), Flash Video ("FLV"), Apple QuickTime Movie (".MOV"), RealVideo, Audio Video Interlaced ("AVI"), RealAudio, DivX, Joint Photographic Experts Group ("JPEG"), Portable Network Graphics ("PNG"), and/or any other media data formats suitable for representing media content. Data descriptive of or otherwise associated with local media content 112 may include information about the media content, such as media content metadata, content access rights data (e.g., DRM data), media data format information, media content source information, media content provider information, and any other information related to the media content. Accordingly, local media content 112 and related data may represent a library of media content that is stored within local network 110, such as a user's personal digital media content collection stored on one or more media content access devices located within a home network.

Figure 2:
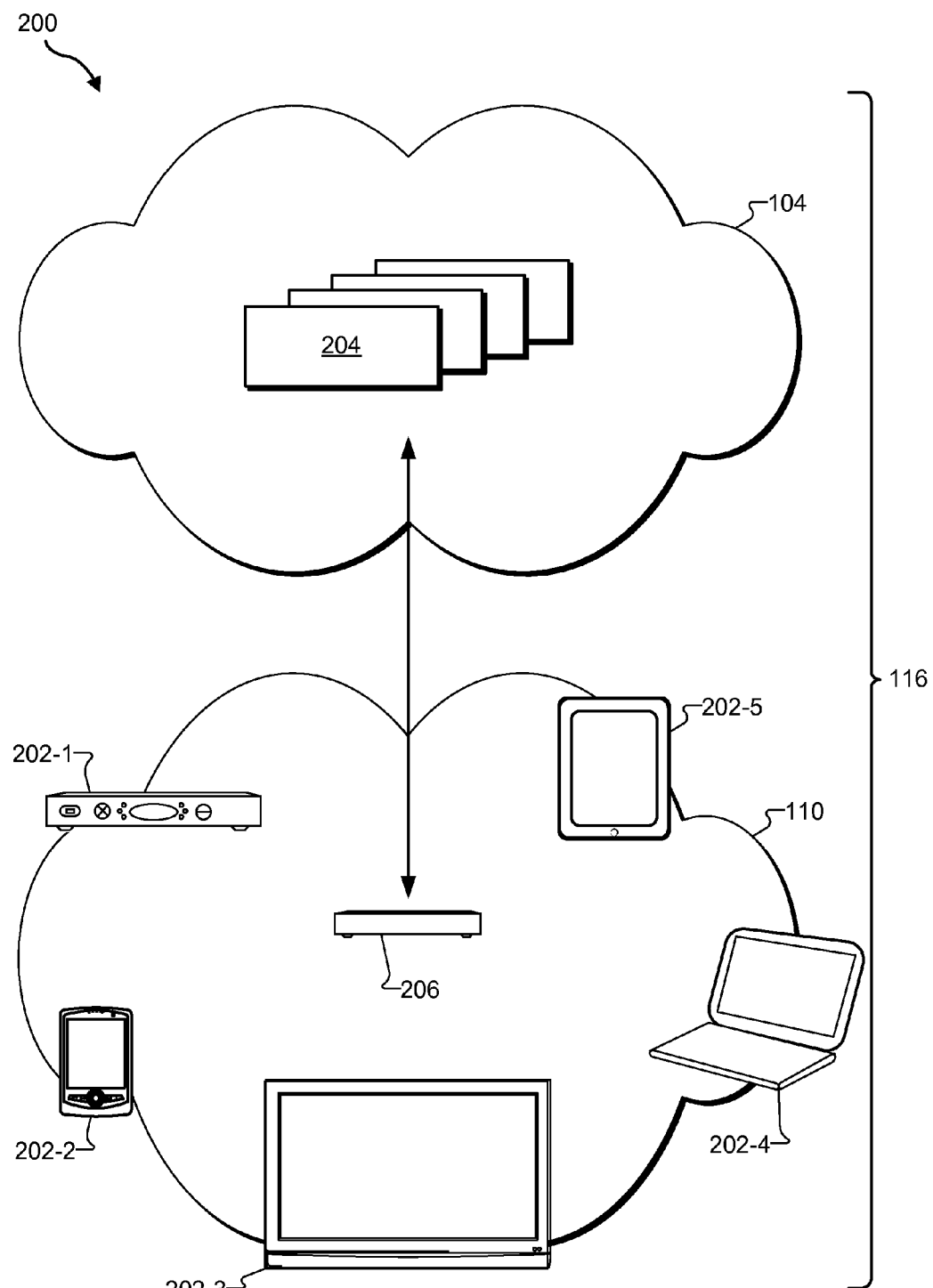
FIG. 2 illustrates an exemplary implementation of the system of FIG. 1 according to principles described herein.

Any suitable media content access devices may be located within local subsystem 108 and configured to store local media content 112. To illustrate, FIG. 2 shows an exemplary implementation 200 of system 100. In implementation 200, local subsystem 108 includes media content access devices 202 (e.g., media content access devices 202-1 through 202-5) located within and configured to communicate via local network 110. Media content access devices 202 may include any electronic devices configured to access, store, and/or process media content. For example, media content access devices 202 may include one or more set-top box devices, mobile phones, smartphones, tablet computes, personal computers (e.g., desktop, laptop, and/or notebook computers), televisions, digital video recorders ("DVRs"), gaming console devices, and/or any other electronic devices configured to access, store, and/or process media content.

Media content access devices 202 may have diverse capabilities related to accessing and/or processing media content. For example, media content access devices 202 may be configured to process different media data formats, process media content at different bit rates, display media content at different resolutions, access media content in accordance with different access control technologies, rights, and/or permissions (e.g., different DRM properties), access different media distribution channels (e.g., different media distribution networks), access media content from different sources, etc. As an example, one of the media content access devices 202 may be configured to process protected MPEG-4 video while another one of the media content access device 202 is not. As another example, one of the media content access devices 202 may be configured to gain access to media content from a particular source in accordance with content access rights of the media content while another one of the media content access device 202 is not. As yet another example, one of the media content access devices 202 may be configured to gain access to media content via a particular media distribution channel such as a wide area wireless data network (e.g. a 3G or 4G network) while another one of the media content access device 202 is not.

Cloud network 104 may include any network of computing devices that is separate from local network 110 and provides one or more media content services for access by an end user. For example, FIG. 2 illustrates cloud subsystem 102 to include multiple cloud computing devices 204 that may be included within cloud network 104 in implementation 200.

Cloud computing devices 204 may include any cloud-based computing devices (e.g., one or more server devices, data storage devices, routers, switches, etc.) configured to provide one or more cloud-based media content services.

As used herein, a "cloud" or "cloud-based" element may refer to any computing device, service, network, media content, and/or other element of system 100 that is not included and/or not originated in local network 110. Typically, a cloud element is operated by and/or otherwise associated with an entity other than the entity operating local network 110. For example, a cloud element may be operated by and/or otherwise associated with a content provider, a content distributor, or a third party that is different from an end user who operates or is otherwise associated with local network 110. In certain examples, cloud subsystem 102 may include one or more cloud computing devices 204 located within a service provider data center and configured to provide one or more services for access by way of a wide area network such as the Internet.

Cloud network 104 may be separate from local network 110 in one or more ways. For example, the networks may be operated by different entities (e.g., local network 110 may be operated by an end user of media content services and cloud network 104 may be operated by a media content provider, media service provider, or third party), may be located at different physical locations (e.g., local network 110 may be located at a user's home and cloud network 110 may be located at and/or provided from a service provider's data center), may include separate computing devices, and/or may be configured to communicate only by a remote connection (e.g., a connection over a wide area network such as the Internet and/or a local area network other than local network 110).

Cloud subsystem 102 may provide one or more cloud-based media content services, examples of which include, but are not limited to, online media content management, online media content storage (e.g., Internet-based media content storage), media content streaming, media on-demand, media content pay-per-view, media content rental, media content purchase, media content guide, media content search, and media content subscription services (e.g., subscription television and/or video services). In certain implementations, cloud subsystem 102 is configured to provide an Internet-based online media content storage and management service that may be accessed and utilized by a user to upload media content to remote data storage devices, manage the hosted stored media content, and access the hosted media content from the remote data storage devices.

Cloud media content 106 may include any data representative of media content that is stored by one or more cloud computing devices 204 located within cloud network 104, as well as data descriptive of or otherwise associated with cloud media content 106. For an online media management service provided by cloud computing devices 204, for example, cloud media content 106 may include media content stored within cloud network 104 as part of the service. For a media distribution service, cloud media content 106 may include media content that is distributed as part of the service. Data descriptive of or otherwise associate with cloud media content 106 may include media content metadata, content access rights data (e.g., DRM data), media data format information, media content source information, media content provider information, and any other information related to cloud media content 106.

Management subsystem 114 shown in FIG. 1 is configured to provide functionality that facilitates providing a user of media content access devices, such as media content access devices 202 shown in FIG. 2, with agnostic access to local media content 112 and cloud media content 106. In particular, management subsystem 114 may be configured to bridge and manage local media content 112 stored in local network 110 and cloud media content 106 stored in cloud network 104 in one or more of the ways described herein to facilitate agnostic access to the local media content 112 and cloud media content 106.

Management subsystem 114 may include or be implemented by one or more computing devices (e.g., one or more media content access devices) configured to perform the operations of management subsystem 114 described herein. FIG. 2 illustrates a computing device 206 located within local network 110 and that may be configured to implement one or more components of management subsystem 114. Computing device 206 may be configured to communicate with media content access devices 202 by way of local network 110 and with one or more cloud computing devices 204 by way of cloud network 104. Computing device 206 may include a device dedicated to providing the bridging and management functionality described herein. Alternatively, computing device 206 may include a media content access device, such as any of media content access devices 202, configured to provide the bridging and management functionality described herein.

In certain examples, management subsystem 114 may be implemented entirely within computing device 206. In other examples, management subsystem 114 may be implemented by computing device 206 and one or more of media content access devices 202. For example, computing device 206 may implement certain components of management subsystem 114, and media content access devices 202 may implement certain components of management subsystem 114 in the form of client applications (e.g., full or thin client applications) configured to perform one or more of the operations described herein as part of and/or in relation to the bridging and management of media content by computing device 206. Such client applications may be implemented by media content access devices in any suitable way, including by manufacturer and/or after-market installation of the client applications. Client application operations may include, without limitation, accessing and providing device and/or media content information to computing device 206 (e.g., information about a media content access device, media content stored by the device, and/or events related to processing of media content by the device) and/or providing a user interface through which agnostic access to media content is facilitated.

Figure 3:
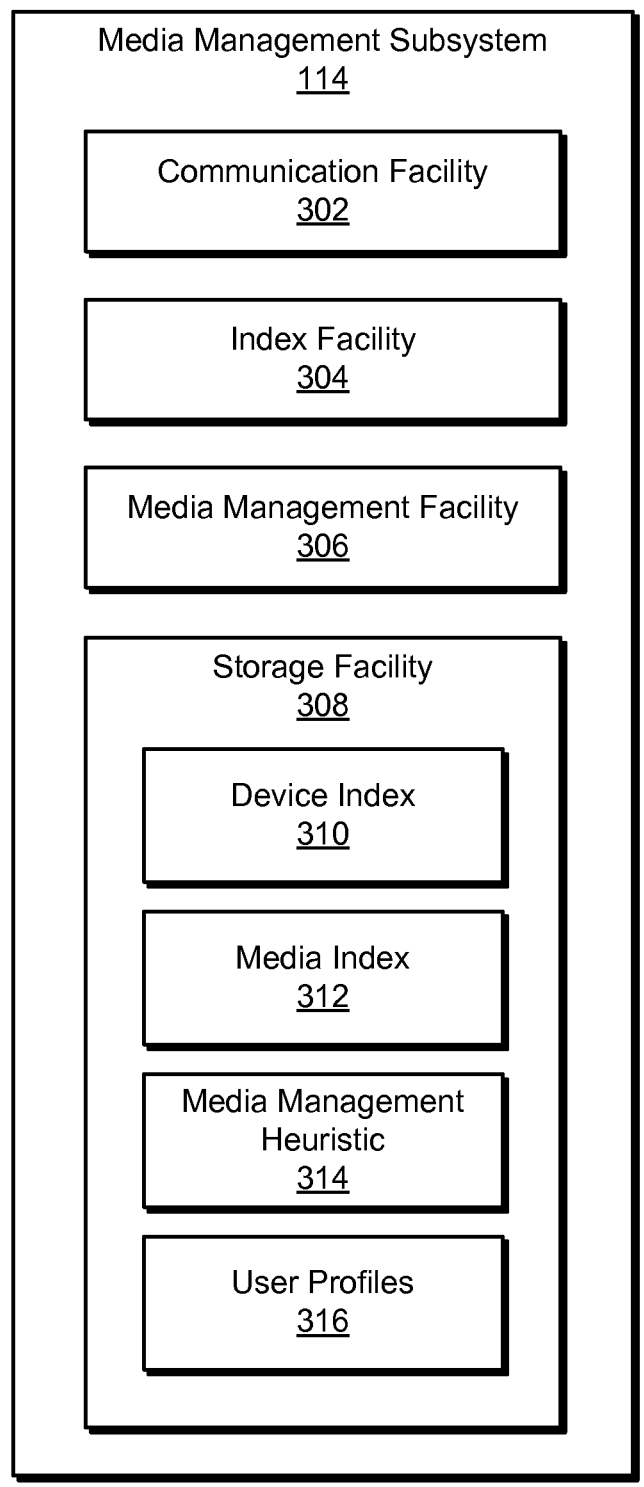
FIG. 3 illustrates exemplary components of a media management subsystem according to principles described herein.

Exemplary functionality of management subsystem 114 will now be described. FIG. 3 illustrates exemplary components of management subsystem 114. As shown, management subsystem 114 may include a communication facility 302, an index facility 304, a media management facility 306 ("management facility 306"), and a storage facility 308, which may be in communication with one another using any suitable communication technologies. The facilities 302-308 may be implemented by one or more computing devices, including by computing device 206 or any combination of computing device 206, cloud computing devices 204, and media content access devices 202. Each of the facilities 302-308 will now be described.

Storage facility 308 may be configured to maintain data representative of a device index 310, a media index 312, a media management heuristic 314 ("heuristic 314"), and one or more user profiles 316, each of which may be generated, maintained, and/or utilized by one or more facilities 302-306 of management subsystem 114 as described herein. Storage facility 308 may maintain additional or alternative data, including any of the data disclosed herein.

Communication facility 302 may be configured to facilitate communications between computing devices using any communication technologies suitable to support the functionality of management subsystem 114 described herein. For example, communication facility 302 may be configured to facilitate communications between computing device 206 and media content access devices 202 located within local network 110 via local network 110 using any suitable communication protocols and/or technologies. These communications may use various protocols and/or technologies supported by the media content access devices 202. For example, communication facility 302 may facilitate communications between computing device 206 and one of the media content access devices 202 using a first communication protocol or technology and between computing device 206 and another one of the media content access devices 202 using a second communication protocol or technology. Examples of communication protocols and/or technologies that may be employed by communication facility 302 include, without limitation, communication protocols and/or technologies supported by local network 110 (e.g., IEEE 802.11 and/or Ethernet based communications), Apple Airplay technology, Digital Living Network Alliance ("DLNA") technology, media streaming protocols, media transfer protocols, media information sharing protocols, and any combination or sub-combination thereof. In addition, communication facility 302 may be configured to facilitate communications between computing device 206 and one or more cloud computing devices 204 located within cloud network 104 using any suitable communication protocols and/or technologies. Examples of such communication protocols and/or technologies include, without limitation, Internet-based communication technologies (e.g., HTTP, TCP, IP, etc.), media streaming protocols, media transfer protocols, media information sharing protocols, and any combination or sub-combination thereof. Communications facilitated by communication facility 302 between computing devices may support funneling of media content and/or sharing of media content information between computing devices.

Index facility 304 may be configured to generate and maintain one or more indices containing information about devices with which communication facility 302 is able to facilitate communications and/or media content associated with the devices. For example, index facility 304 may generate and maintain device index 310, which may include information descriptive of and/or otherwise associated with one or more devices (e.g., media content access devices 202 and/or cloud computing devices 204) with which communication facility 302 is able to facilitate communications. The information in device index 310 may include information about device attributes, including, without limitation, device identifiers, information about device capabilities, properties, and/or resources (e.g., information descriptive of the media content access and/or processing capabilities of devices such as over which distribution channels or interfaces devices are able to access media content), information about connections with devices (e.g., information specifying whether a connection with a device is by way of local network 110, cloud network 104, or other connection), information about availability of devices, information about content access rights of devices, information about settings of devices (e.g., parental control and/or other media content access settings), information about users or user profiles associated with devices, addresses of devices, and any other information about attributes of the devices.

FIG. 4 illustrates an example of device index 310 having entries 402 (e.g., entries 402-1 through 402-6) for media content access devices 202 and a cloud computing device 204. As shown, each entry 402 may specify an identifier for a device, a type of the device (e.g., whether the device is a STB, smartphone, television, laptop, tablet computing, server, or other type of device), media data formats that the device is capable of processing, a type of connection with the device (e.g., whether the device is connected via a LAN such as local network 110, connected via a WAN such as cloud network 104 and/or the Internet, or not currently connected), one or more content access (e.g., DRM) rights or technologies that the device has and/or is capable of using (e.g., whether the device has and/or is capable of accessing a DRM technology labeled "DRM A," a DRM technology labeled "DRM B," or both DRM A and DRM B), and one or more types of interfaces that a device can use to access media content (e.g., HDMI, S-Video, Wi-Fi, USB, 3G, 4G, Ethernet, Composite, and other interfaces).

The exemplary device index 310 shown in FIG. 4 is illustrative only. Other implementations of device index 310 may include any alternative and/or addition information associated with one or more devices, including any of the device information disclosed herein (e.g., the media content distribution channels over which a device is able to access media content). The information included in device index 310 may be stored in any suitable data format and/or structure(s).

Index facility 304 may generate device index 310 in any suitable way. For example, index facility 304 may be configured to automatically detect compatible devices with which communication facility 302 is able to communicate and to query and obtain device information from the devices. For example, index facility 304 may direct computing device 206 to request and obtain device information from detected media content access devices 202. To illustrate, computing device 206 may detect and communicate, via local network 110, with one or more media content access devices 202 connected to local network 110 to obtain information about the devices 202. Any suitable communication technologies may be employed for this purpose, including any device discovery and/or information sharing communication technologies. Additionally or alternatively, index facility 304 may be configured to obtain device information from media content access devices 202 of which index facility 304 is made aware by user input (e.g., during a user device registration dialogue with the user). Accordingly, at least to a certain extent, the devices for which information is included in device index 304 may be controlled by an end user. In some examples, the devices represented in device index 310 qualify as devices to be trusted by management subsystem 114.

In addition to obtaining device information from media content access devices 202, index facility 304 may be configured to communicate with and obtain device and/or corresponding cloud media content service information from cloud computing devices 204 of which index facility 304 is aware. For example, index facility 304 may direct computing device 206 to communicate, via a wide area network such as the Internet, with any cloud computing devices 204 of which management subsystem 114 is aware to obtain information about cloud computing devices 204 and/or a media content service provided by cloud computing devices 204. Any suitable communications may be employed for this purpose, including Internet-based communications.

Index facility 304 may become aware of a cloud computing device 204 and/or a cloud media content service in any suitable way. For example, a user may input information (e.g., during setup or installation of management subsystem 114 and/or a cloud service registration dialogue with the user) about the cloud computing device 204 and/or service for use by management subsystem 114. As another example, index facility 304 may be configured to obtain information about the cloud service and/or corresponding cloud computing device 204 from settings of one or more media content access devices 202 that are configured to access the cloud media content service provided by the cloud computing device 204.

In addition or alternative to the generation of device index 310, index facility 304 may be configured to generate and maintain media index 312 containing information descriptive of and/or otherwise associated with media content stored by or otherwise associated with one or more devices with which communication facility 302 is able to facilitate communications (e.g., one or more of the devices represented in device index 310). For example, index facility 304 may be configured to generate and maintain media index 312 containing information about local media content 112 stored by one or more media content access devices 202 located within local network 110 and cloud media content 106 stored and/or distributed by one or more cloud computing devices 204 located within cloud network 104.

Index facility 304 may generate media index 312 to include information obtained from devices with which management subsystem 114 is able to facilitate communications. For example, index facility 304 may direct computing device 206 to request and obtain information about media content stored by and/or otherwise associated with media content access devices 202 and cloud computing devices 204. To illustrate, computing device 206 may detect and communicate, via local network 110, with any media content access devices 202 connected to local network 110 to obtain information about media content stored on the devices 202. Any suitable communication protocols and/or technologies may be employed for this purpose, including Apple Airplay, DLNA, and/or other media information sharing communication protocols and/or technologies.

In addition to obtaining media content information from media content access devices 202, index facility 304 may be configured to communicate with and obtain media content and/or cloud service information from cloud computing devices 204 of which index facility 304 is aware. For example, index facility 304 may direct computing device 206 to communicate with any cloud computing devices 204 of which management subsystem 114 is aware to obtain information about media content stored by, distributed by, and/or otherwise associated with cloud computing devices 204 and/or a media content service provided by cloud computing devices 204. Any suitable communications may be employed for this purpose, including Internet-based communications. Index facility 304 may become aware of a cloud computing device 204 and/or cloud media content service in any suitable way, as described herein.

Index facility 304 may use information obtained from media content access devices 202 and cloud computing devices 204 to generate media index 312. Media index 312 may be in any suitable form and may include any information related to media content associated with local network 110 and cloud network 104. Examples of information that may be included in media index 312 include, but are not limited to, media content identifiers, descriptions, titles, synopses, ratings, durations, formats, resolutions, bit rates, content access rights (e.g., DRM properties), sources, providers, distribution channels, user associations, device associations, storage locations, histories (e.g., access histories), usage patterns, and information about any other media content attributes.

Figure 5:
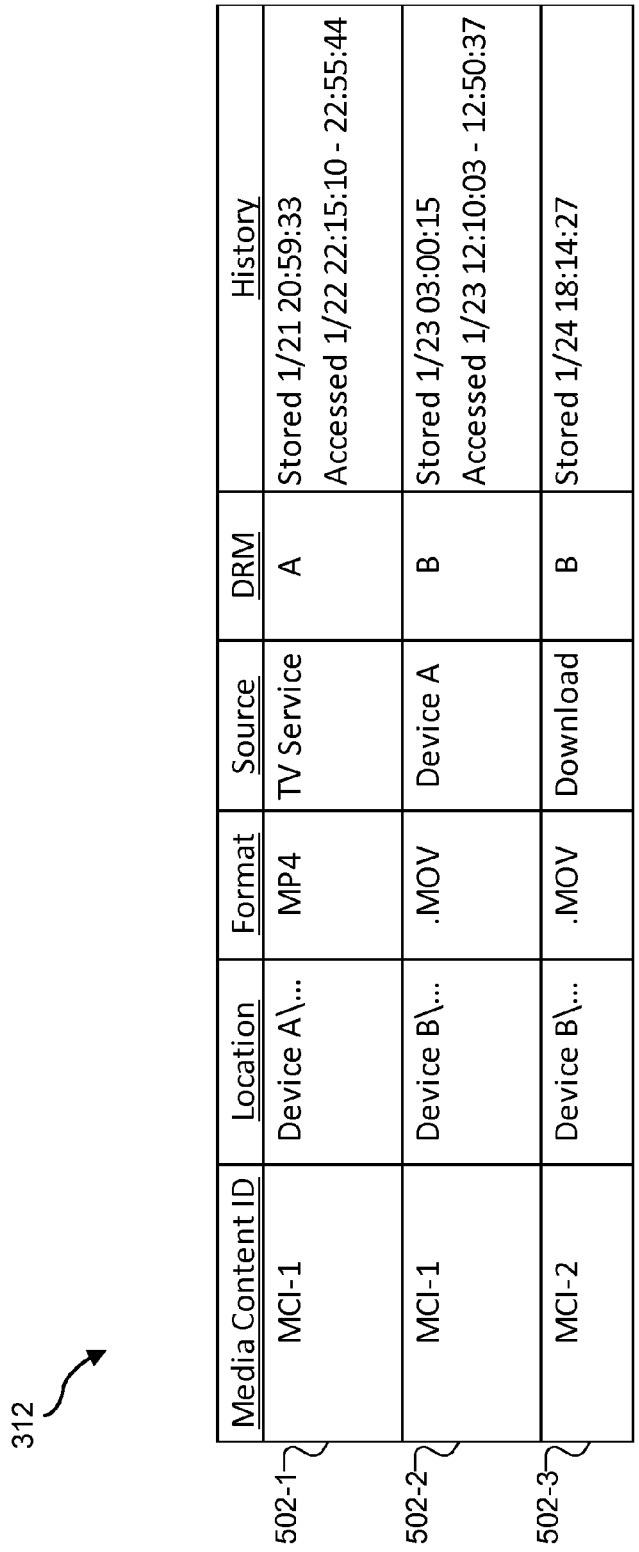
FIG. 5 illustrates an exemplary media index according to principles described herein.

FIG. 5 illustrates an example of media index 312 having entries 502 (e.g., entries 502-1 through 502-3) for media content instances. As shown, entry 502-1 may specify an identifier for a particular media content instance (e.g., "MCI-1"), a location at which the media content instance is stored (e.g., a location on a device labeled "Device A"), a media data format in which the media content instance is stored (e.g., format "MP4"), a source of the media content instance (e.g., a source labeled "TV service"), one or more content access (e.g., DRM) properties (e.g., a DRM property labeled "DRM A")), and a history of events associated with the media content instance (e.g., a history showing when the media content instance was stored and subsequently accessed on Device A). Entry 502-2 specifies information for another copy of the same media content instance labeled "MCI-1." As shown, entry 502-2 specifies an identifier for the media content instance (e.g., "MCI-1"), a location at which the media content instance is stored (e.g., a location on a device labeled "Device B"), a media data format in which the media content instance is stored (e.g., format ".MOV"), a source of the media content instance (e.g., a source labeled "Device A"), one or more content access (e.g., DRM) properties (e.g., a DRM property labeled "DRM B")), and a history of events associated with the media content instance (e.g., a history showing when the media content instance was stored and subsequently accessed on Device B). In similar fashion, entry 502-3 specifies information associated with another media content instance labeled "MCI-2."

Media index 312 shown in FIG. 5 is illustrative only. Other implementations of media index 312 may include any alternative and/or additional information associated with media content, including any of the media content attribute information disclosed herein. The information included in media index 312 may be stored in any suitable data format and/or structure(s).

Index facility 304 may be configured to maintain any generated indices, such as device index 310 and media index 312, by continuing to obtain device and media content information and using the information to update the indices. For example, index facility 304 may update information included in the indices to reflect detected events related to devices and/or media content. The events may be detected by index facility 304 in any suitable way, including by index facility 304 directing computing device 206 to communicate with media content access devices 202 and/or cloud computing devices 204 to obtain information about the devices, media content associated with the devices, operations performed by the devices, or by computing device 206 receiving updates otherwise provided by media content access devices 202 and/or cloud computing devices 204. Additionally or alternatively, index facility 304 may detect operations performed by management subsystem 114 indicative of changes to device and/or media content information. To illustrate, index facility 304 may be configured to detect when a media content access device 202 is located within local network 110 (e.g., by determining that the media content access device 202 is able to communicate with computing device 206 via local network 110), unavailable or located outside of local network 110 (e.g., by determining that the media content access device 202 is unable to communicate with computing device 206 via local network 110), and/or attempting to access media content from within or outside of local network 110. As another illustration, index facility 304 may be configured to detect when media content is being streamed to/from a device, played back by a device, deleted from a device, stored to a device, and any other operations performed on media content. In certain examples, communications associated with media content may be directed through computing device 206, which may analyze the communications to detect media content operations and to update one or more indices accordingly. In any of these or similar ways, index facility 304 may track devices and media content within system 100 and maintain indices that specify the status of devices and media content within system 100. As described herein, such tracking of information facilitates control by management subsystem 114 of media content associated with system 100.

Data representative of device index 310 and media index 312 may be stored at any suitable data storage location(s). For example, the information included in device index 310 and media index 312 may be maintained at a central location such as within computing device 206. Alternatively, the information included in device index 310 and media index 312 may be distributed across multiple devices such as across computing device 206, media content access devices 202, and/or cloud computing devices 204.

In certain implementations, index facility 304 may be configured to automatically generate device index 310 and/or media index 312 in response to an introduction of computing device 206 into local network 110. Accordingly, in some examples, an end user operating local network 110 may introduce computing device 206 into local network 110 by placing computing device 206 within the footprint of local network 110 and configuring computing device 206 to access local network 206. In response, computing device 206 may automatically generate device index 310 and/or media index 312 as described herein.

One or more of the indices generated and maintained by index facility 304 may be used by management facility 306 in any of the ways and for any of the media management operations described herein. The generation, maintenance, and/or use of the indices, as described herein, may be said to bridge local media content 112 stored in local network 110 and cloud media content 104 stored in cloud network 104 to create overall media content access network 116 shown in FIGS. 1-2.

Returning to FIG. 3, management facility 306 may be configured to manage media content included in or otherwise accessible via media content access network 116. The management of the media content may include selectively and intelligently performing any of the media management operations described herein based on one or more indices generated by index facility 304 and on heuristic 314. Examples of media management operations that may be performed by management facility 306 may include, without limitation, providing access to information included in device index 310 and/or media index 312, facilitating and receiving requests to access media content, determining one or more device and/or media content attributes to use to fulfill requests for media content, determining and providing access to media content that is a "best fit" for a request, funneling (e.g., copying, streaming, transferring, downloading, or uploading content) media content between local network 110 and cloud network 104 (e.g., between a media content access device 202 and a cloud computing device 204), funneling within local network 110 (e.g., shifting or sharing media content between media content access devices 202), transcoding media content, upscaling and/or downscaling media content, enforcing access rights associated with media content, managing access rights of media content, deleting media content, determining media content usage patterns, controlling transmission and/or receipt of media content, and controlling processing of media content. Selective performance of one or more of these operations as governed by heuristic 314 may facilitate providing a user with agnostic and/or seamless access to media content.

Heuristic 314 may include data specifying defined conditions configured to be used by management facility 306 to determine what media management operations to perform, as well as when and/or or how to perform the media management operations. The conditions specified in heuristic 314, which may be defined by content providers, service providers, an end user, or a combination or sub-combination thereof, may be used by management facility 306 to selectively and intelligently perform any of the media management operations described herein in a way that facilitates agnostic and seamless access to media content associated with separate networks. To illustrate such intelligence, examples of selecting and performing certain media management operations will now be described.

Figure 6:
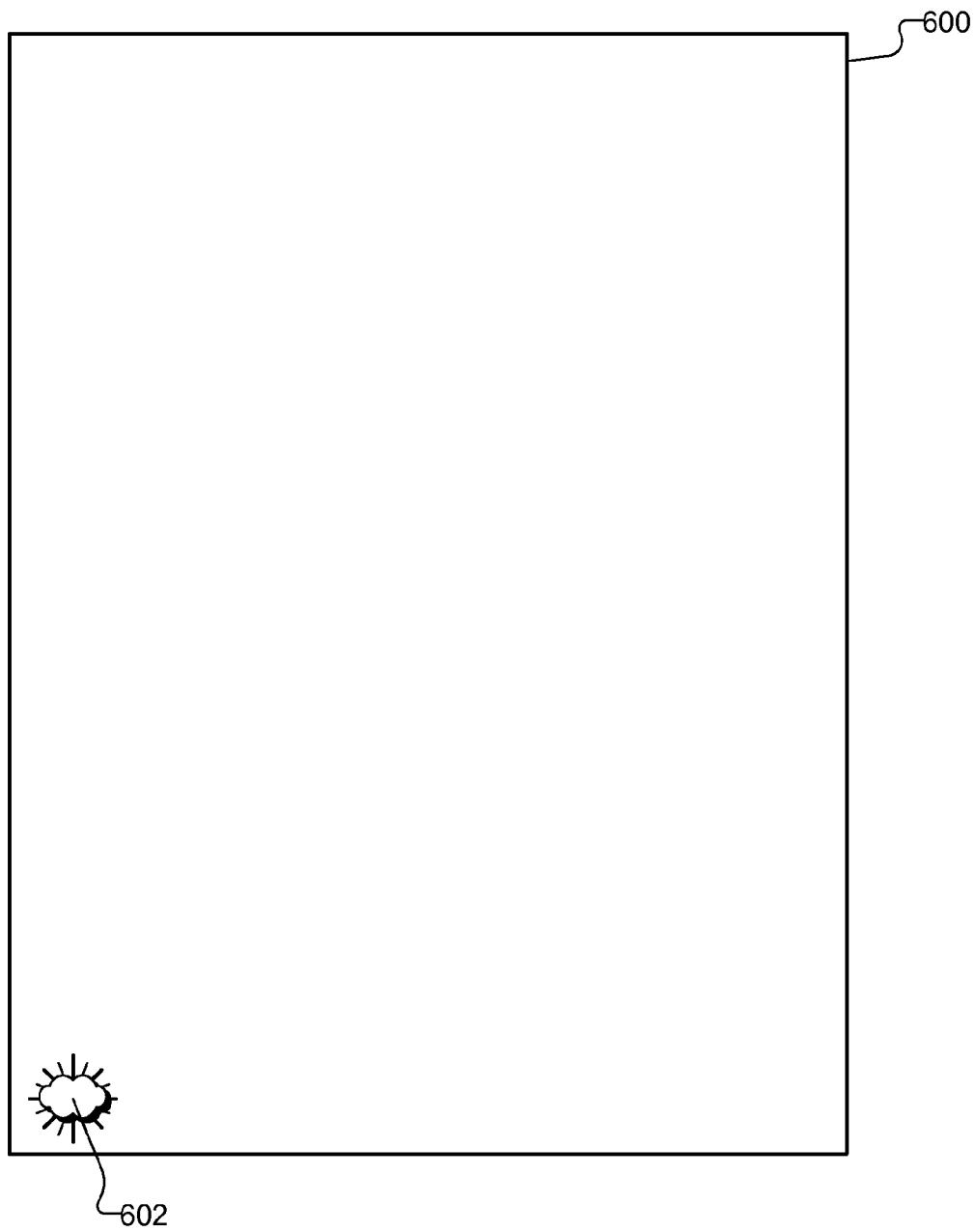
FIGS. 6-7 illustrate exemplary views of a graphical user interface according to principles described herein.
Figure 7:
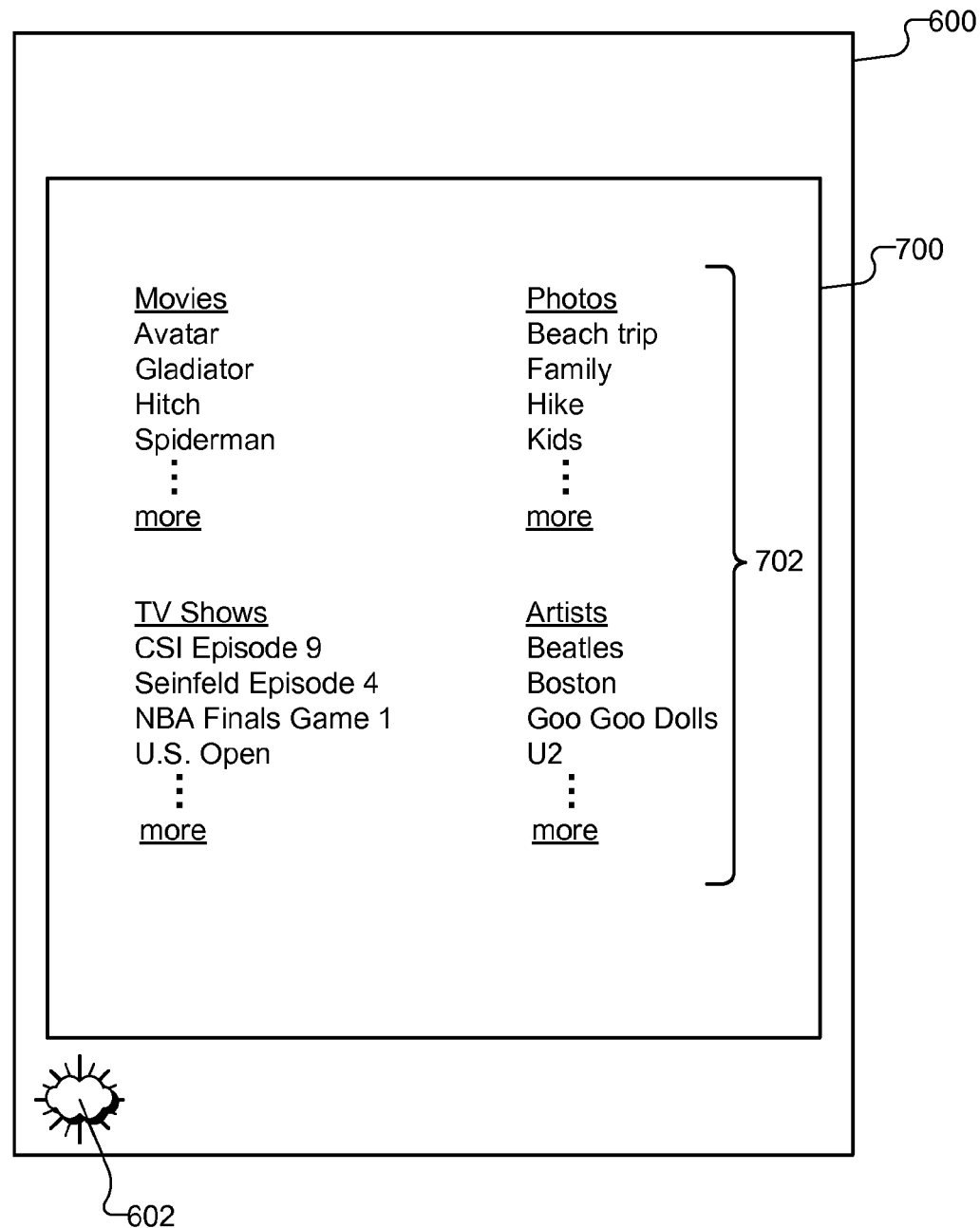

As mentioned, management facility 306 may be configured to facilitate and receive requests to access media content. In certain examples, this may include management facility 306 providing a user interface with which a user may interact to initiate requests for media content. FIGS. 6-7 illustrate views of an exemplary graphical user interface ("GUI") 600 that may be provided by management facility 306 for display by a media content access device, such as any of media content access devices 202. As shown in FIG. 6, GUI 600 may include a selectable option 602, a user selection of which is configured to trigger a launch of an interface to information included in media index 312. FIG. 7 illustrates a window 700 displayed within GUI 600 in response to a user selection of option 602. As shown, window 700 may include information 702 about available media content represented in media index 312. Management facility 306 may access the information 702 from media index 312 and provide it to the media content access device for display in window 700 in response to the user selection of option 602. Accordingly, the information may be descriptive of local media content 112 and cloud media content 106.

In this or a similar manner, management facility 306 may provide information included in media index 312 for use by a media content access device and/or a user of the device to identify and request access to media content. The information may be provided by management facility 306 to an access device located within local network 110 and/or to an access device located outside of local network 110, as described herein. For example, a user may utilize a tablet computer located within local network 110 to access information from media index 312. The user may also utilize the tablet computer located outside of local network 110 to again access information from media index 312. Such remote access to media index 312 is described in more detail below.

In the example shown in FIG. 7, the displayed information 702 omits information about certain attributes of the media content, which omission helps create an interface that facilitates agnostic access to the media content. For example, the displayed information 702 does not include information about sources, distribution channels, bit rates, resolutions, data formats, or certain other attributes of media content. Accordingly, a user of the media content access device is able use GUI 600 to find and select desired media content included in local media content 112 and/or cloud media content 106 without having to consider certain attributes of the media content, such as sources, distribution channels, bit rates, resolutions, and data formats of the media content.

The information 702 shown in FIG. 7 is illustrative only. Any additional or alternative information obtainable from media index 312 may be displayed in window 700 as may suit a particular implementation.

A user of the media content access device displaying GUI 600 may use the media content information 702 displayed in window 700 to find and select a particular media content instance included in local media content 112 and/or cloud media content 106 in any suitable manner. In response to a user selection of a media content instance in GUI 600, the media content access device may generate and submit a request for access to the media content instance. Management facility 306 may receive and determine how to process the request, based on heuristic 314 and information included in the request, device index 310, and/or media index 312, in order to provide agnostic and seamless access to the media content instance to fulfill the request. This processing may be performed transparently to the user such that the user may conveniently use one or more media content access devices to agnostically and seamlessly access media content stored in and/or otherwise associated with local network 110 and cloud network 104.

In determining how to process a request to access media content based on heuristic 314 and information included in the request, device index 310, and/or media index 312, management facility 306 may determine one or more attributes of the media content that are to be used to provide access to the media content. This determination may be based on one or more factors, including one or more attributes of the media content access device requesting access to the media content. To illustrate, management facility 306 may receive a media content access request from a particular media content access device. The request may include data indicating that the media content access device is the source of the request. Management facility 306 may access information about the media content access device in device index 310, and from this information determine one or more attributes of the media content access device, including any of the exemplary device attributes disclosed herein.

Management facility 306 may use the one or more determined device attributes to determine how to process the request. For example, management facility 306 may access and use information included in media index 312 to identify media content that is a "best fit" for the device attributes. As used herein, "best fit" media content refers to a selection of media content, selected from available media content, that is best matched to device attributes associated with a content access request and/or best equipped for use in fulfilling a media content access request in a way that provides a quality and seamless response to the request. Media content may be determined to be a best fit for fulfilling a request for any number and/or combination of reasons defined by conditions specified in heuristic 314. For example, media content may be a best fit for one or more device attributes associated with a content access request due to a source from which the media content can be accessed, a distribution channel from which the media content can be accessed, a bit rate of the media content, a resolution of the media content, a storage location of the media content, content access rights of the media content, a connection and/or location of the requesting device, and/or any other attributes of the media content.

Conditions specified by heuristic 314 may define criteria for determining "best fit" media content. The criteria may prioritize device attributes and/or media content attributes relative to one another. The criteria and their relative priorities to one another may be defined to lead to a selection of media content that is a best fit for facilitating agnostic and seamless access to media content. Several examples of determining "best fit" media content based on device and media content attributes, as governed by heuristic 314, will now be described.

In certain examples, management facility 306 may determine that a request for media content is from a device located within and/or having a connection with local network 110. One or more conditions specified in heuristic 314 may indicate certain attributes of media content that may be used to select "best fit" media content to be used to fulfill an access request from a device located within and/or having a connection with local network 110. For example, local network 110 may be known to provide a relatively high capacity and/or secure local connection, and heuristic 314 may specify that no restrictions should be placed on the attributes of media content that may be used to fulfill an access request from a device located within and/or having a connection with local network 110. Accordingly, management facility 306 may select the best quality media content that is available to be provided to the requesting device within an acceptable response time threshold.

As another example, heuristic 314 may specify that relatively higher quality media content (e.g., media content with higher bit rates and/or resolutions, such as high-definition or standard-definition video content), media content having certain content access rights (e.g., content access rights that allow the media content to be accessed via a LAN connection), media content accessible from certain sources (e.g., from other devices connected to local network 110), media content accessible via certain distribution channels (e.g., LAN streaming or file transfer) be used and/or prioritized by management facility 306 to select "best fit" media content to be used to fulfill an access request from a device located within and/or having a connection with local network 110. Based on these conditions, management facility 306 may query media index 312 to identify any media content that is available from a source within local network 110 for funneling to the requesting device via local network 110 and having quality and content access rights that are preferred for fulfilling the request. If such media content is found, management facility 306 may initiate a providing of the media content to the requesting device. Conversely, if such media content is not found, management facility 306 may determine a next best available option, such as media content from another source, from another distribution channel, having a different quality, or having different content access rights. Heuristic 314 may specify a prioritized order of importance to place on the various media content attributes such that management facility 306 may step through media content attributes in a defined order until "best fit" media content is identified for use in fulfilling a request.

In certain other examples, management facility 306 may determine that the requesting device is located outside of and/or does not currently have a connection with local network 110. For example, a user may utilize a mobile phone, tablet computer, or other portable device when outside of local network 110 (e.g., when away from home) to access media content included in media content access network 116. System 100 may be configured to provide access to the media content, including to both cloud media content 106 and local media content 106, to a compatible media content access device located outside of local network 110. This may be accomplished in any suitable way. In certain implementations, for example, a media content access device may have a wireless connection (e.g., a 3G or 4G wireless connection) to a cloud computing device 204 via a WAN such as the Internet. Cloud computing device 204 may be configured to authenticate the media content access device and/or its user. Thereafter, cloud computing device 204 may provide the media content access device with access to cloud media content 106 by way of the wireless connection (e.g., by streaming or facilitating download of the cloud media content 106 from cloud network 104 to the media content access device via the wireless connection). In addition, cloud computing device 204 may be configured to facilitate media content access device accessing local media content 112 by way of the wireless connection. In some examples, cloud computing device 204 may relay communications between the media content access device and computing device 206. In other examples, cloud computing device 204 may provide the media content access device with information (e.g., an IP address and/or other address information of computing device 206) that the media content access device may use to communicate with computing device 206 to request and access local media content 112. Once the media content access device has established a remote connection with computing device 206, computing device 206 may function as a two-way proxy between the media content access device and cloud computing device 204 located within cloud network 104 and/or between the media content access device and one or more media content access devices 202 located within local network 110. Accordingly, a trusted media content access device may be used to access media content from within and/or outside of local network 110.

One or more conditions specified in heuristic 314 may indicate certain attributes of media content that may be used, not used, and/or prioritized when selecting media content to be used to fulfill an access request from a device located outside of local network 110. For example, heuristic 314 may specify that relatively lower quality media content (e.g., media content with lower bit rates and/or resolutions), media content having certain content access rights (e.g., content access rights that allow the media content to be accessed outside of local network 110), media content accessible from certain sources (e.g., from cloud network 104), media content accessible via certain distribution channels (e.g., WAN streaming or file transfer) be used and/or prioritized by management facility 306 to select "best fit" media content to be used to fulfill an access request from a device located outside of local network 110.

The above-described examples illustrate conditions that may be specified by heuristic 314 for use by management facility 306 in selecting "best fit" media content based on a location and/or a connection of a requesting device. Heuristic 314 may specify additional or alternative conditions that may be used by management facility 306 to select "best fit" media content based on additional and/or alternative attributes of the requesting device. For example, heuristic 314 may specify media content attributes to be used, not used, and/or prioritized for device types (e.g., certain media data formats may be well suited and prioritized for certain types of devices), media content processing capabilities of devices (e.g., certain media data formats may be prioritized based on processing capabilities of devices), content access rights of devices (e.g., certain media content having certain content access rights may be prioritized based on content access rights associated with devices), connection usage and/or capacities of device connections, user profiles associated with devices, media distribution channels accessible by devices (e.g., the Internet, a television service, a wireless data network, etc.), and available connection interfaces (e.g., HDMI, USB, wireless, etc.) of devices.

Thus, heuristic 314 may specify one or more conditions that may be used by management facility 306 to select, from available media content such as indexed local media content 112 and cloud media content 106, "best fit" media content based on one or more device and/or media content attributes. In certain examples, "best fit" media content may not be available in local media content 112 or cloud media content 106. For instance, local media content 112 and cloud media content 106 may not include media content having attributes that acceptably match, as defined by heuristic 314, with media content attributes identified by management facility 306 for use in fulfilling a request. In such examples, management facility 306 may be configured to search outside of local media content 112 and cloud media content 106 for acceptable media content. To illustrate, management facility 306 may determine that local media content 112 and cloud media content 106 do not include media content having a particular DRM property that is to be used to fulfill a request from a certain requesting device. In response, management facility 306 may query one or more potential sources of media content for the desired media content having the particular DRM property. For example, management facility 306 may query a provider of the requested media content (e.g., a content provider, publisher, or distributor) and/or alternative media content providers for a copy of the media content that has the particular DRM property (and/or other media content attribute(s) in other examples).

Capabilities of management facility 306, which may be specified in heuristic 314, may be taken into account by management facility 306 when determining "best fit" media content. For example, management facility 306 may be configured to transcode media content from certain media data formats to other media data formats, upscale media content, downscale media content, or otherwise process media content. Management facility 306 may be configured to take such capabilities into account when determining "best fit" media content. To illustrate, a particular media content instance being requested may not be stored in local media content 112 or cloud media content 110 in a media data format that can be processed by the requesting device. Management facility 306 may determine that the media content instance is stored in another data format and that management facility 306 is equipped to transcode from that data format to a data format that can be processed by the requesting device. This information may be used to determine and provide the "best fit" media content to be provided to fulfill the request.

As another example, in certain implementations, management facility 306 may be configured to manage and enforce content access rights for media content associated with system 100. Content access rights may be enforced in any suitable way in system 100. In certain examples, management facility 306 may be configured to function as a pass-through entity such that content access rights simply pass through management facility 306. In such examples, media content access devices 202 maintain their own content access rights data and are able to receive and process media content for which they have appropriate content access rights. Management facility 306 may identify and provide access to media content that has content access rights that are compatible with the content access rights of a device.

In other examples, management subsystem 114 may be configured to provide and manage a global content access rights technology. In such examples, the global content access rights technology may be used in place of content access rights tied to media content and/or media content access devices. To illustrate, management facility 306 may determine that local media content 112 and cloud media content 106 do not include a copy of a requested media content instance having a particular DRM property that is needed by a requesting device. Management facility 306 may determine, based on heuristic 314, that a global DRM technology supported by management facility 306 may be used in place of the DRM property to provide the requesting device with access to the media content instance. Management facility 306 may then perform one or more operations to associate the global DRM technology with a copy of the media content instance included in local media content 112 or cloud media content 106. For example, the copy of the media content instance may be wrapped within the global DRM technology or transcoded to a format than implements the global DRM technology. In certain examples, management facility 306 may be configured to use a global DRM technology only when heuristic 314 indicates that its use is allowed by a provider of the relevant media content.

The above-described content access rights management and enforcement may help ensure that access to media content included in media content access network 116 is not limited by diverse content access rights that are specific and/or proprietary to media content, computing platform, and/or a provider of media content. In addition, content providers may be willing to provide media content to and/or allow access to media content through system 100 because management facility 306 is able to enforce the content access rights preferred by the content provider, thereby keeping the media content secure to the satisfaction of the content provider. For example, by tracking media content within system 100, management subsystem 114 is able to identify, report, and/or delete any copies of media content that violate content access rights. By managing and enforcing content access rights in accordance with preferences of content providers, management facility 306 may help reduce the number of media content access and/or troubleshooting requests that the content providers receive from users, thereby offloading some of the request processing burden from the content providers. This may further induce content providers to allow their media content to be accessed through system 100.

Heuristic 314 may be defined to specify conditions representative of content access rights associated with media content included in media content access network 116. For example, heuristic 314 may specify that media content having certain content access rights be provided for access only locally from within local network 110 and not for access from outside of local network 110. Such conditions may represent content access rights dictated by providers of media content, as described above.

Heuristic 314 may be defined as may suit a particular implementation. Accordingly, based on heuristic 314, management facility 306 may identify "best fit" media content to be provided to fulfill a request for media content. In making this determination, device and/or media content attributes may be prioritized as defined by heuristic 314 as may suit a particular implementation. To illustrate one example, management facility 308 may receive a request for a media content instance from a requesting device and determine attributes of the requesting device from device index 310. Management facility 306 may then search media index 312 for information about the requested media content instance to determine a "best fit" available copy of the media content instance. In making this determination, management facility 306 may step through checks for desired device and/or media content attributes as defined by heuristic 314. For instance, in some examples, heuristic 314 may specify that content access rights are prioritized over other attributes of media content. Accordingly, management facility 306 may determine whether the information included in media index 312 indicates that a copy of the requested media content instance having content access rights that match up with the content access rights of the requesting device is available. If there is, management facility 306 may proceed to check the next media content attribute in the defined order of priority. For instance, in some examples, management facility 306 may determine whether any of the identified copies of media content instances having acceptable content access rights also have a media data format that can be accessed and process by the requesting device. Such a step-through approach may continue through the prioritized list of device and/or media content attributes until a "best fit" available copy of the media content instance is identified.

After "best fit" media content has been determined by management facility 306 for a content access request, management facility 306 may perform one or more other media management operations to fulfill the request. For example, management facility 306 may facilitate a funneling of data representative of the media content from a selected source of the media content to the requesting device, transcode media content from one data format to another, upscale or downscale the media content, manage and/or enforce access rights associated with the media content, and/or control transmission, receipt, and processing of the media content.

Funneling of media content from a source to a requesting device may include the media content being transmitted between cloud network 104 and local network 112 (e.g., "upstream" transmission from local network 110 to cloud network 104 or "downstream" transmission from cloud network 104 to local network 110) and/or between devices located within local network 110. Management facility 306 may facilitate such funneling in any suitable way, including by communicating with one or more devices to initiate funneling of media content between the devices and/or functioning as an intermediary for the funneling of media content between the devices. The funneling may include streaming, downloading, uploading, file transfer, and/or any other transmission of media content between devices.

In certain embodiments, management facility 306 may be configured to control transmission, receipt, and/or processing of media content in a way that may intelligently leverage resources of devices within local network 110 in order to provide seamless access to media content. For example, multiple devices within local network 110 may be equipped with connection interfaces that allow the devices to connect with cloud network 104. For example, some devices 202 may be able to connect to cloud network 104 via local network 110 and computing device 206 and other devices 202 may additionally be able to connect to cloud network 104 via other connections such as wireless WANs (e.g., 3G or 4G wireless connections). Management facility 306 may identify devices with such connection interfaces, check the status of these devices (e.g., current processing and/or data transmission by the devices), and leverage available resources of these devices. For instance, management facility 306 may divide a task of downloading or streaming media content from cloud network 104 into multiple subtasks, and assign the subtasks to multiple devices within local network 110. For example, each device capable of connecting to cloud network 104 and having availability for bandwidth transfer may be instructed to connect to cloud network 104 and download a portion of the requested media content. The downloads may be performed concurrently. To illustrate, computing device 206 may utilize is connection to cloud network 104 to download a portion of media content and instruct one or more devices 202 having 3G and/or 4G wireless connection interfaces to download other portions of the media content via their independent 3G and/or 4G wireless connections to cloud network 104. Management facility 306 may be configured to further instruct the devices to perform one or more operations to facilitate reconstruction of the downloaded media content into a form that is accessible by the requesting device. The reconstruction operations may include transmitting the downloaded portions to the requesting device for reconstruction by the requesting device or to management facility 306 for aggregation and transmission to the requesting device. Processing and/or other resources of devices within local network 110 may be similarly leveraged by management facility 306. By leveraging the resources of multiple devices within local network 110, a quick and seamless response to a media content access request may be provided transparently to the user of the requesting device.

In certain embodiments, management facility 306 may be configured to control funneling of content in a way that allows management facility 306 to access media content from a source and distribute the accessed media content to multiple media content access devices. In some examples, management facility 306 may concurrently distribute the accessed media content to multiple devices. As an example, computing device 206 implementing management facility 306 may request and receive a content stream from a cloud computing device 204 in cloud network 104. The content stream may comprise any stream of media content from any suitable cloud media content source (e.g., an online media storage service, a media on-demand service, or an online video service such as may be provided by Netflix, YouTube, or other online video service). Computing device 206 may process the received content stream in a manner that facilitates computing device 206 transmitting data representative of the media content carried by the content stream to multiple media content access devices 202 via local network 110. The processing may include any processing of the received content stream and/or media content carried by the received content stream that produces data and/or content streams suitable for transmission to media content access devices 202, and for reception and processing by media content access devices 202. Examples of such processing may include, without limitation, forwarding the received content stream, demultiplexing the received content stream, decoding data carried in the received content stream, transcoding data carried in the received content stream from one media data format to another, upscaling or downscaling the received content stream, converting from one content access rights technology to another, encoding decoded data, multiplexing encoded data to a new stream, and any other processing. After such processing is performed, computing device 206 may transmit content streams to target media content access device 202 via local network 110.

By computing device 206 functioning as a media content access and distribution device, a user of devices 202 may be provided broad and/or convenient access to cloud media content 106. For example, the user may be able to utilize any of devices 202, including more than one of the devices 202 concurrently, to access cloud media content 106 by way of computing device 206. In addition, the burden placed on a provider of a cloud media content service may be reduced. For example, the cloud media content service may be asked to provide only a single content stream when a user wants to experience the media content carried by the content stream on multiple device 202, as opposed to the cloud media content service having to provide multiple content streams, one for each of the media content access devices 202.

While the above-described examples are of media management operations selectively and intelligently performed by management facility 306 in response to a media content access request, management facility 306 may be additionally or alternatively configured to proactively perform one or more media management operations based on heuristic 314. For example, one or more of the media management operations described herein may be performed by management facility 306 based on media content usage patterns, which may be determined from data included in device index 310, media index 312, and/or other suitable data structure. As mentioned above, for example, media index 312 may include data representing media content access events, which data may for a history of media content access. From the access history, management facility 306 may determine usage patterns and/or other information that may be helpful in anticipating future requests for media content. Management facility 306 may selectively, intelligently, and proactively perform any of the media management operations in any of the ways described herein based on heuristic 314, device index 310, media index 312, and/or usage patterns associated with media content. Accordingly, management facility 306 may prepare media content to be provided agnostically and seamlessly in response to a request that is anticipated by management facility 306 based on media content usage patterns.

To illustrate, based on a media content access history, management facility 306 may determine a pattern of a first media content access device 202 being used to first access and store certain media content (e.g., episodes of a particular television series) and of a second media content access device 202 being used to request access to and the media content for playback and experiencing by a user. For instance, a DVR device may record episodes of a broadcast television series, and a tablet computer may be subsequently used to request and play back the episodes of the television series. Management facility 306 may detect such a pattern and proactively perform one or more management operations in anticipation of the tablet computer requesting access to the media content. For example, management facility 306 may funnel the media content from the first device 202 to the second device 202 (e.g., from the DVR to the tablet computer), from the first device 202 to cloud computing device 204, or from the first device 202 to computing device 206 in anticipation of a request from the tablet computer to access the media content. Additionally or alternatively, management facility 306 may transcode the media content from one data format to another, apply a different content access rights technology to the media content, create an upscaled or downscaled copy of the media content, obtain a copy of the media content from another source (e.g., from cloud network 104), and/or perform any other media management operations on the media content based on usage patterns.

As described herein, management operations may be selectively performed based on one or more attributes of a requesting device. To further illustrate, in the present example of management facility 306 preparing media content for use in responding to an anticipated request, the manner in which the media content is prepared may be based on one or more attributes of a device that is anticipated to request the media content. For example, the tablet computer in the present example may include a wireless network interface (e.g., a 3G or 4G wireless network interface) that has been used in the past to access media content when the tablet computer is located outside of local network 110. The wireless network interface attribute may be indicated in device index 310. Based on this attribute and the detected usage pattern, management facility 306 may funnel media content from local network 112 to cloud network 104 in anticipation of a request for the media content received from the tablet computer located outside of local network 110. Alternatively, tablet computer may not include a wireless network interface (e.g., a 3G or 4G wireless network interface). Accordingly, instead of funneling media content from local network 112 to cloud network 104 in anticipation of a request for the media content received from the tablet computer located outside of local network 110, management facility 306 may funnel media content from the DVR device to the tablet computer when the tablet computer is located within local network 110 in anticipation of a future request for the media content being received from the tablet computer when the tablet computer is located outside of local network 110. The tablet computer may cache the media content such that the media content is readily accessible when the tablet computer is located outside of local network 110.

As another example of proactive management of media content in system 100, management facility 306 may be configured to perform one or more media management operations in anticipation, based on usage patterns, that a user is finished with and/or will not access media content again. For example, based on usage patterns, management facility 306 may determine that a user typically accesses media content received from a particular source (e.g., recorded television content from a television programming provider) only once. After the user has accessed such media content, management facility 306 may perform one or more operations such as pulling the media content back from a media content access device (e.g., from a tablet computer on which the media content was cached), deleting the media content (e.g., from the tablet computer and/or the DVR device), and/or funneling the media content from local network 110 to cloud network 104 for archival. In this or a similar manner, management facility 306 may move media content from local network 110 to cloud network 104 when, based on usage patterns, a request for the media content is not anticipated and/or may move media content from cloud network 104 to local network 110 (e.g., to one or more media content access devices 202) when, based on usage patterns, a request for the media content is anticipated. This may allow media content to be cycled between local network 110 and cloud network 104 in anticipation of requests.

In certain examples, management facility 306 may be configured to provide a configuration user interface that may be used by a user to define one or more conditions in heuristic 314 to be used by management facility 306 to govern what media management operations are performed and when and/or how they are performed by management facility 306. The configuration user interface may allow the user to customize the automatic management of media content by management facility 306 as may suit the preferences of the user.

The bridging and managing of media content as described herein may be leveraged by one or more applications to further provide a quality user experience related to media content. For example, media index 312 may include information about advertisement breaks included in media content, and management facility 306 may be configured to use this information to select and insert fresh advertisement content into the advertisement breaks when media content is played back. To illustrate, management facility 306 may receive data representative of updated advertisement campaigns, which data provides instructions for inserting advertisements into advertisement breaks. Management facility 306 may use the instructions together with information included in media index 312 to determine fresh advertisement content to be dynamically inserted into media content when the media content is played back.

As another example, information included in device index 310 and/or media index 312 may be used by a content shifting and/or sharing application to shift and/or share media content between media content access devices. To illustrate, a user may utilize a tablet computer to communicate with computing device 206 to access information included in media index 312. The information may indicate active media sessions being processed (e.g., media content being played back) by other media content access devices located within local network 110. The user may further utilize the tablet computer to request that an active media content session be shifted and/or shared from one device to another, and the tablet computer may communicate with and request that computing device 206 perform one or more media management operations described herein to facilitate the requested shifting and/or sharing of media content between access devices.

As another example, information included in device index 310 and/or media index 312 may be used by a companion device application to provide a companion device experience to a user. To illustrate, a companion device (e.g., a tablet computer or smartphone) may be used by a user to interact with a companion application (e.g., a remote control and/or enhanced content application) related to media content being presented by a primary media content access device (a STB, DVR, and/or television). The companion device may access information included in device index 310 and/or media index 312 for use by the companion application running on the companion application.

As another example, information included in device index 310 and/or media index 312 may be used by a data storage management application to load balance data storage across devices included in system 100. To illustrate, such an application may be configured to selectively move media content between data storage devices, based on information included in device index 310 and/or media index 312, to balance the load associated with storing the media content and/or to protect the media content.

These exemplary applications leveraging the bridging and managing of media content described herein are illustrative only. Other applications may additionally or alternatively leverage the bridging and managing of media content described herein.

Figure 8:
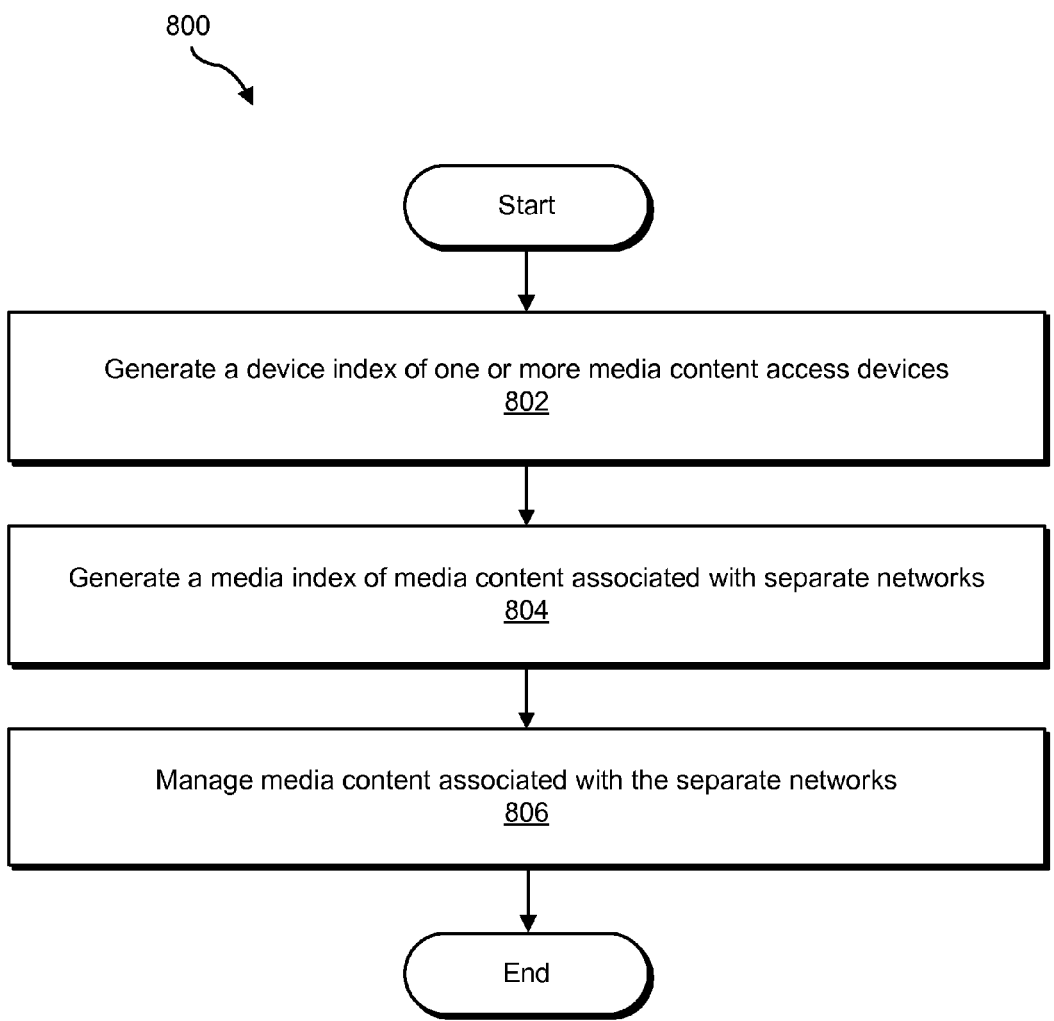
FIG. 8 illustrates an exemplary method of bridging and managing media content associated with separate media content networks according to principles described herein.

FIG. 8 illustrates an exemplary method 800 of bridging and managing media content associated with separate media content networks according to principles described herein. While FIG. 8 illustrates exemplary steps according to one embodiment, other embodiments may omit, add to, combine, reorder, and/or modify any of the steps shown in FIG. 8. In certain examples, method 800 may be performed by management subsystem 114 and/or computing device 206.

In step 802, management subsystem 114 and/or computing device 206 may generate a device index of one or more media content access devices. The device index may be generated and maintained in any of the ways and may contain any of the device information described herein. The media content access devices represented in the device index may include a set of devices associated with a user or user profile, connected to local network 104, detected through local network 104, and/or registered by a user for inclusion in the device index.

In step 804, management subsystem 114 and/or computing device 206 may generate a media index of media content associated with separate networks, such as local network 110 and cloud network 104. The media index may be generated and maintained in any of the ways and may contain any of the media content information described herein.

In step 806, management subsystem 114 and/or computing device 206 may manage media content associated with the separate networks. The media content may be managed in any of the ways described herein, including management subsystem 114 and/or computing device 206 selectively and intelligently performing one or more media management operations based on a predefined media management heuristic (e.g., heuristic 314) and information included in the device index and/or the media index.

Figure 9:
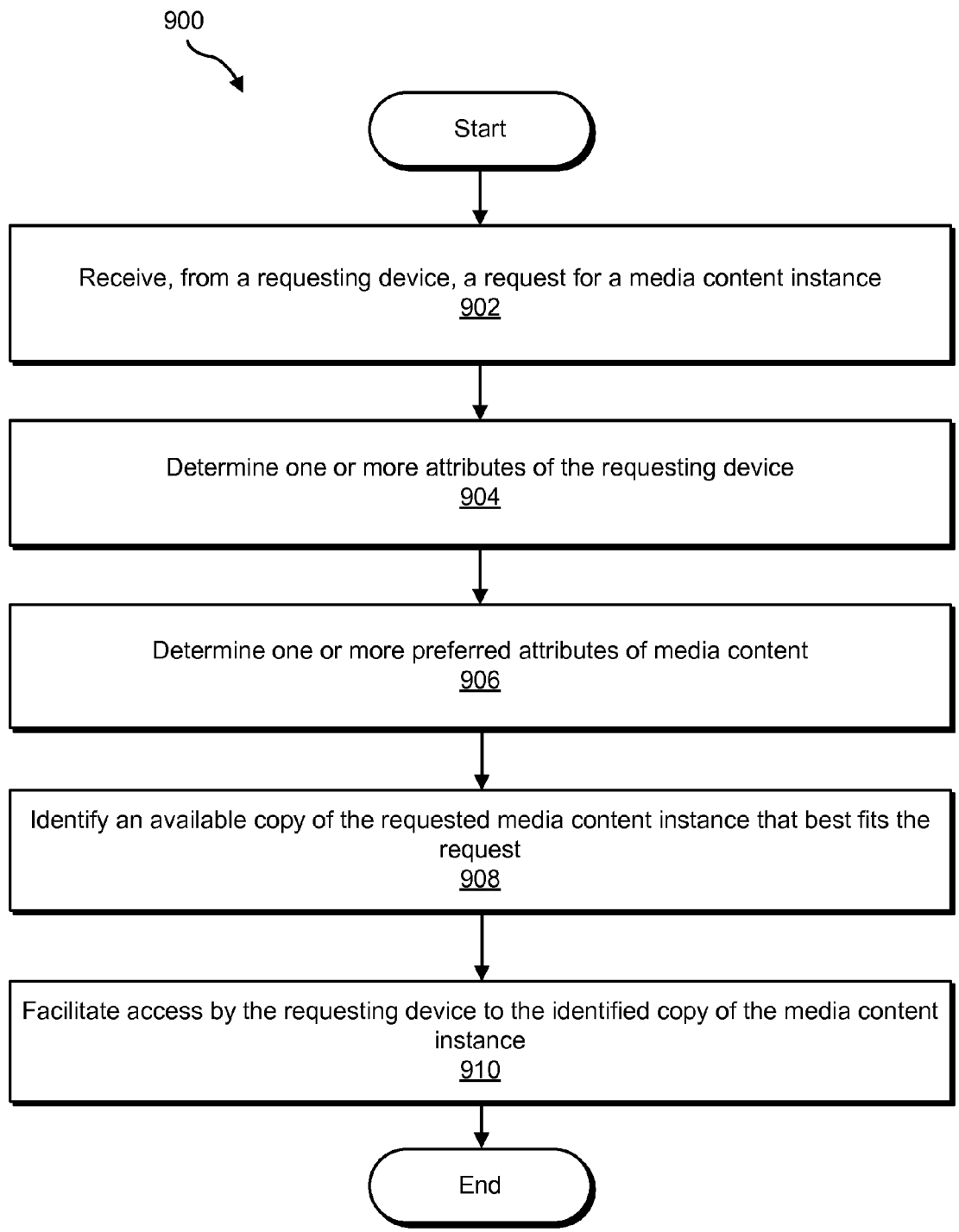
FIG. 9 illustrates an exemplary method of managing bridged media content associated with separate media content networks according to principles described herein.

FIG. 9 illustrates an exemplary method 900 of managing bridged media content associated with separate media content networks according to principles described herein. While FIG. 9 illustrates exemplary steps according to one embodiment, other embodiments may omit, add to, combine, reorder, and/or modify any of the steps shown in FIG. 9. In certain examples, step 806 of method 800 may comprise one or more steps of method 900. In certain examples, method 900 may be performed by management subsystem 114 and/or computing device 206.

In step 902, management subsystem 114 and/or computing device 206 may receive a request for a media content instance from a requesting device, such as described herein. The request may be for a media content instance included in at least one of local media content 112 and cloud media content 106.

In step 904, management subsystem 114 and/or computing device 206 may determine one or more attributes of the requesting device. Step 904 may be performed as described herein, including by making the determination based on device index 310.

In step 906, management subsystem 114 and/or computing device 206 may determine one or more preferred attributes of media content. Step 906 may be performed as described herein, including by making the determination based on the one or more determined attributes of the requesting device and on heuristic 314. The preferred attributes of media content may include any media content attributes specified by heuristic 314 as being preferred for providing "best fit" media content to the requesting device having the attributes determined in step 904.

In step 908, management subsystem 114 and/or computing device 206 may identify an available copy of the requested media content instance that best fits the request. Step 908 may be performed as described herein, including by identifying the "best" fit copy of the media content instance based on the one or more attributes of media content determined in step 906, media index 312, and heuristic 314.

In step 910, management subsystem 114 and/or computing device 206 may facilitate access by the requesting device to the identified copy of the media content instance. Step 910 may be performed as described herein, including by performing any of the media management operations (e.g., funneling, transcoding, and/or controlling transmission and/or reception of media content) described herein.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 10:
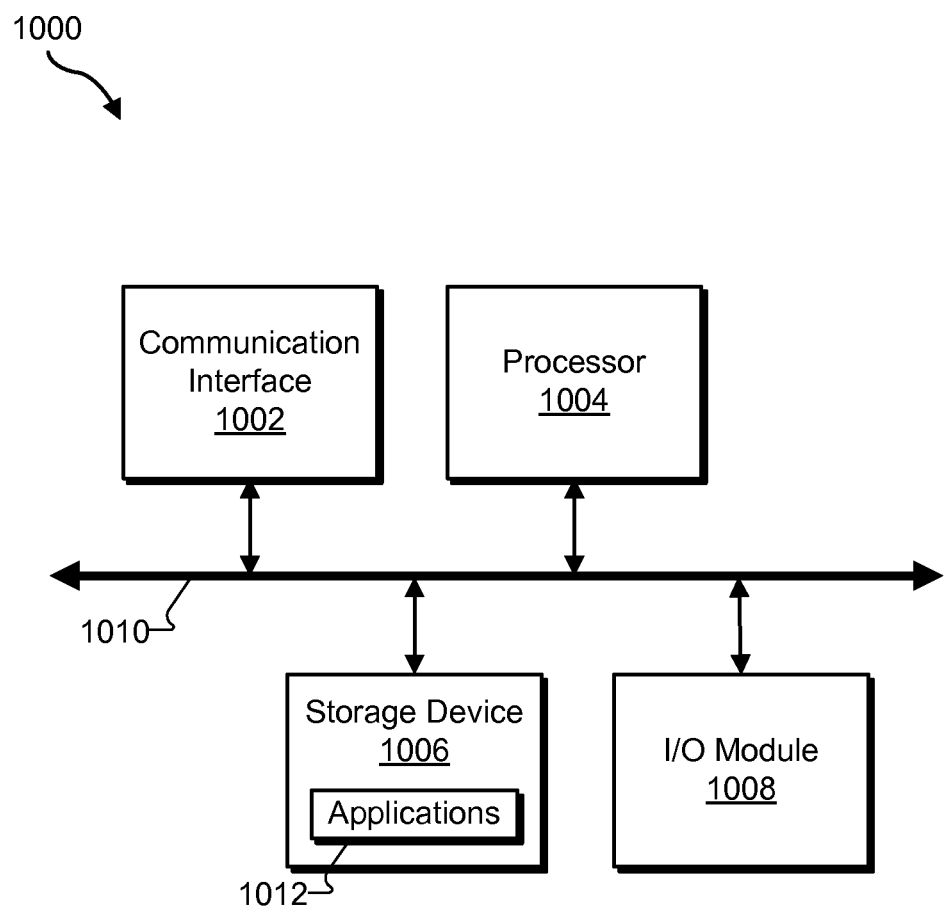
FIG. 10 illustrates an exemplary computing device according to principles described herein.

FIG. 10 illustrates an exemplary computing device 1000 that may be configured to perform one or more of the processes described herein. As shown in FIG. 10, computing device 1000 may include a communication interface 1002, a processor 1004, a storage device 1006, and an input/output ("I/O") module 1008 communicatively connected via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, and any other suitable interface. Communication interface 1002 may additionally or alternatively provide such a connection through, for example, a local area network (such as an Ethernet network), a personal area network, a telephone or cable network, a satellite data connection, a dedicated URL, an Internet access network, or any other suitable connection. Communication interface 1002 may be configured to interface with any suitable communication media, protocols, and formats.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another non-transitory computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1006. For example, data representative of one or more executable applications 1012 (which may include, but are not limited to, one or more of the software applications described herein)

configured to direct processor 1004 to perform any of the operations described herein may be stored within storage device 1006. In some examples, data may be arranged in one or more databases residing within storage device 1006.

I/O module 1008 may be configured to receive user input and provide user output and may include any hardware, firmware, software, or combination thereof supportive of input and output capabilities. For example, I/O module 1008 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1008 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1000. For example, one or more applications 1012 residing within storage device 1006 may be configured to direct processor 1004 to perform one or more processes or functions associated with communication facility 302, index facility 304, and/or management facility 306. Likewise, storage facility 308 may be implemented by or within storage device 1006.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    generating, by a computing device located within a local media content network, a media index of local media content stored by one or more media content access devices located within the local media content network and cloud media content stored by one or more cloud computing devices within a cloud media content network;
    generating, by the computing device, a device index of the one or more media content access devices located within the local media content network;
    managing, by the computing device based on the media index, a predefined media management heuristic, and the device index, the local media content and the cloud media content;
    wherein the managing comprises:
        receiving, from a requesting device, a request for a media content instance included in at least one of the local media content and the cloud media content;
        determining, based on the device index, one or more attributes of the requesting device;
        determining, based on the one or more attributes of the requesting device and the predefined media management heuristic, one or more preferred attributes of media content;
        identifying, based on the one or more attributes of media content, the media index, and the predefined media management heuristic, an available copy of the requested media content instance that best fits the request; and
        facilitating access by the requesting device to the identified copy of the media content instance.

2. The method of claim 1, wherein the generating of the media index comprises:
    detecting, by the computing device, the one or more media content access devices located within the local media content network;
    communicating, by the computing device, with the one or more media content access devices via the local media content network to obtain information about the local media content stored by the one or more media content access devices; and
    using, by the computing device, the information to generate the media index.

3. The method of claim 1, wherein the generating of the media index is performed automatically in response to an introduction of the computing device into the local media content network.

4. The method of claim 1, wherein the generating of the media index comprises:
    communicating, by the computing device, with the one or more cloud computing devices via a wide area network to obtain information about the cloud media content stored by the one or more cloud computing devices; and
    using, by the computing device, the information to generate the media index.

5. The method of claim 1, wherein the managing of the local media content and the cloud media content includes providing the one or more media content access devices with access to information included in the media index.

6. The method of claim 5, wherein the providing the one or more media content access devices with access to information included in the media index comprises providing the information to a media content access device included in the one or more media content access devices for display in a graphical user interface to facilitate a request for access to a media content instance included in at least one of the local media content and the cloud media content.

7. The method of claim 5, wherein the providing the one or more media content access devices with access to information included in the media index comprises providing the information to a media content access device included in the one or more media content access devices when the media content access device is located within the local media content network and again when the media content access device is located outside of the local media content network.

8. The method of claim 1, wherein the one or more attributes of the requesting device include at least one of a device type, a media content processing capability, a content access right, a network connection, a location, and an available connection interface of the requesting device.

9. The method of claim 1, wherein the one or more attributes of the media content include at least one of a source, a storage location, a distribution channel, a content provider, a service provider, a content access right, and a media data format associated with the media content.

10. The method of claim 1, wherein:
the determining of the one or more attributes of the requesting device comprises determining that the requesting device is located within the local media content network; and
the determining of the one or more attributes of the media content comprises determining at least one of a preferred source, a preferred media data format, and a preferred content access right of the media content based on the requesting device being located within the local media content network.

11. The method of claim 1, wherein:
the determining of the one or more attributes of the requesting device comprises determining that the requesting device is located outside of the local media content network; and
the determining of the one or more attributes of the media content comprises determining, at least one of a preferred source, a preferred media data format, and a preferred content access right of the media content based on the requesting device being located outside of the local media content network.

12. The method of claim 1, wherein the identifying of the available copy of the requested media content instance that best fits the request is performed in accordance with the content access rights of the available copy of the requested media content instance.

13. The method of claim 1, wherein the managing comprises:
determining a media content usage pattern from the media index; and
selectively performing one or more media management operations on at least one of the local media content and the cloud media content based on the predefined media management heuristic and on the determined media content usage pattern in preparation of an anticipated media content access request.

14. The method of claim 1, wherein the managing facilitates agnostic access by a user to the local media content and the cloud media content.

15. The method of claim 1, wherein:
the local media content network comprises a home local area network; and
the cloud media content network comprises an Internet-based media content storage service network.

16. The method of claim 1, wherein the managing comprises leveraging one or more resources of the one or more media content access devices to perform one or more media management operations on at least one of the local media content and the cloud media content.

17. The method of claim 1, embodied as computer-executable instructions on at least one non-transitory computer-readable medium, the computer-executable instructions configured to direct the computing device to perform the generating of the media index, the generating of the device index, and the managing.

18. A method comprising:
generating, by a computing device located within a local media content network, a media index of local media content stored by one or more media content access devices located within the local media content network and cloud media content stored by one or more cloud computing devices within a cloud media content network; and
managing, by the computing device based on the media index and on a predefined media management heuristic, the local media content and the cloud media content, wherein the managing comprises at least one of
funneling media content included in at least one of the local media content and the cloud media content between the local media content network and the cloud media content network,
funneling media content included in the local media content between the media content access devices via the local media content network,
transcoding media content included in at least one of the local media content and the cloud media content,
upscaling or downscaling media content included in at least one of the local media content and the cloud media content,
deleting media content included in at least one of the local media content and the cloud media content,
enforcing content access rights of media content included in at least one of the local media content and the cloud media content, and
managing content access rights of media content included in at least one of the local media content and the cloud media content.

19. An apparatus comprising:
an indexing facility configured to
generate a media index of local media content stored by one or more media content access devices located within a local media content network and cloud media content stored by one or more cloud computing devices located within a cloud media content service network, and
generate a device index of the one or more media content access devices located within the local media content network;
a storage facility communicatively coupled to the indexing facility and configured to store data representative of the media index, the device index, and a predefined media management heuristic; and
a media management facility communicatively coupled to the storage facility and configured to manage the local media content and the cloud media content based on the media index, the predefined media management heuristic, and the device index, wherein the managing comprises:
receiving, from a requesting device, a request for a media content instance included in at least one of the local media content and the cloud media content;
determining, based on the device index, one or more attributes of the requesting device;
determining, based on the one or more attributes of the requesting device and the predefined media management heuristic, one or more preferred attributes of media content;
identifying, based on the one or more attributes of media content, the media index, and the predefined media management heuristic, an available copy of the requested media content instance that best fits the request; and
facilitating access by the requesting device to the identified copy of the media content instance.

20. A system comprising:
at least one computing device located within a local media content network, the at least one computing device configured to
generate a media index of local media content stored by one or more media content access devices located within the local media content network and cloud media content stored by one or more cloud computing devices located within a cloud media content service network, generate a device index of the one or more media content access devices located within the local media content network, and manage the local media content and the cloud media content based on the media index, a predefined media management heuristic, and the device index, wherein the managing comprises:

receiving, from a requesting device, a request for a media content instance included in at least one of the local media content and the cloud media content;

determining, based on the device index, one or more attributes of the requesting device;

determining, based on the one or more attributes of the requesting device and the predefined media management heuristic, one or more preferred attributes of media content;

identifying, based on the one or more attributes of media content, the media index, and the predefined media management heuristic, an available copy of the requested media content instance that best fits the request; and facilitating access by the requesting device to the identified copy of the media content instance.

* * * * *